US011489792B2

(12) United States Patent
Higuchi et al.

(10) Patent No.: US 11,489,792 B2
(45) Date of Patent: Nov. 1, 2022

(54) VEHICULAR MICRO CLOUDS FOR ON-DEMAND VEHICLE QUEUE ANALYSIS

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Onur Altintas, Mountain View, CA (US)

(*) Notice: Subject to any disclaimer, the term of this patent is extended or adjusted under 35 U.S.C. 154(b) by 362 days.

(21) Appl. No.: 16/739,949

(22) Filed: Jan. 10, 2020

(65) Prior Publication Data

US 2021/0218692 A1 Jul. 15, 2021

(51) Int. Cl.

| | | |
|---|---|---|
| H04L 49/9047 | (2022.01) | |
| H04L 67/12 | (2022.01) | |
| H04L 67/10 | (2022.01) | |
| G05D 1/00 | (2006.01) | |

(52) U.S. Cl.
CPC .......... *H04L 49/9047* (2013.01); *H04L 67/10* (2013.01); *H04L 67/12* (2013.01); *G05D 1/0088* (2013.01); *G05D 2201/0213* (2013.01)

(58) Field of Classification Search
CPC . B60R 16/0231; B60R 16/0232; G01C 21/00; G07C 5/008; B60W 10/18; B60W 10/20; B60W 50/008; B60W 50/045; B60W 2050/0075; B60W 2050/008; B60W 2050/041; B60W 2556/65; H04L 5/14; H04L 67/10; H04L 67/12; H04W 4/40; H04W 4/44; H04W 4/80; H04W 72/04
See application file for complete search history.

(56) References Cited

U.S. PATENT DOCUMENTS 6,470,262 B2  10/2002  Kerner et al.
7,127,507 B1  10/2006  Clark et al.
(Continued)

OTHER PUBLICATIONS

Gerla, M., "Vehicular cloud computing," in Proc. Med-Hoc-Net, 2012, pp. 152-155.
(Continued)

*Primary Examiner* — Marsha D Banks Harold
*Assistant Examiner* — Dharmesh J Patel
(74) *Attorney, Agent, or Firm* — Burbage Law P.C.; Jon-Michael Burbage

(57) ABSTRACT

The disclosure includes embodiments for a connected vehicle to form a vehicular micro cloud. In some embodiments, a method includes determining, by an onboard vehicle computer, that a queue is present in a roadway environment and that a vehicle that includes the onboard vehicle computer is present in the queue. The method includes causing a set of member vehicles to form a vehicular micro cloud in the roadway environment responsive to determining that the queue is present in the roadway environment so that determining that the queue is present triggers a formation of the vehicular micro cloud, where the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles.

20 Claims, 3 Drawing Sheets

(56) References Cited

U.S. PATENT DOCUMENTS

| | | | |
|---|---|---|---|
| 8,913,544 B2 * | 12/2014 | Akita | H04W 24/02 |
| | | | 370/315 |
| 9,077,655 B2 | 7/2015 | Babiarz et al. | |
| 9,391,907 B2 | 7/2016 | Hassan et al. | |
| 9,581,460 B1 * | 2/2017 | McNew | B60W 50/08 |
| 9,672,734 B1 | 6/2017 | Ratnasingam | |
| 10,334,405 B2 * | 6/2019 | Altintas | H04W 4/02 |
| 10,896,609 B2 * | 1/2021 | Higuchi | G08G 1/096844 |
| 2003/0043059 A1 | 3/2003 | Miller, Jr. | |
| 2016/0234654 A1 * | 8/2016 | Tosa | H04L 67/104 |
| 2017/0251339 A1 * | 8/2017 | Addepalli | H04W 12/03 |
| 2018/0146323 A1 | 5/2018 | Tseng et al. | |
| 2019/0132706 A1 | 5/2019 | Altintas et al. | |
| 2019/0132819 A1 | 5/2019 | Tseng et al. | |
| 2019/0191265 A1 | 6/2019 | Altintas et al. | |

OTHER PUBLICATIONS

Lee, E. et al., "Vehicular cloud networking: architecture and design principles," IEEE Communications Magazine, vol. 52, No. 2, 2014, pp. 148-155.

Hagenauer, F. et al., "Vehicular micro clouds as virtual edge servers for efficient data collection," in Proc. ACM CarSys '17, Oct. 20, 2017, pp. 31-35.

Higuchi, T. et al., "On the Feasibility of Vehicular Micro Clouds," Proc. IEEE VNC, 2017, pp. 179-182.

Hagenauer, F. et al., "Parked cars as virtual network infrastructure: Enabling stable V2I access for long-lasting data flows," in Proc. ACM CarSys '17, Oct. 20, 2017, pp. 57-64.

\* cited by examiner

VEHICULAR MICRO CLOUDS FOR ON-DEMAND VEHICLE QUEUE ANALYSIS

BACKGROUND

The specification relates to vehicular micro clouds.

Connected vehicles form clusters of interconnected vehicles (e.g., via vehicle-to-everything, i.e., "V2X") that are located at a similar geographic location. Such clusters are known as "vehicular micro clouds."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: determining, by an onboard vehicle computer, that a queue is present in a roadway environment and that a vehicle (e.g., a connected vehicle) that includes the onboard vehicle computer is present in the queue; and causing a set of member vehicles (e.g., a set of connected vehicles) to form a vehicular micro cloud in the roadway environment responsive to determining that the queue is present in the roadway environment so that determining that the queue is present triggers a formation of the vehicular micro cloud, where the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles. Other embodiments of this aspect include corresponding computer systems, apparatus, and computer programs recorded on one or more computer storage devices, each configured to perform the actions of the methods. In some embodiments, the vehicles described herein are connected vehicles.

Implementations may include one or more of the following features. The method where the set of member vehicles execute a remedial action to respond to a presence of the queue. The method where the set of member vehicles includes a sub-set of autonomous vehicles and autonomous driving systems of the sub-set of autonomous vehicles modify their operation in order to respond to the queue and conform to a set of goals of a driving plan being executed by the autonomous driving systems. The method where none of the set of member vehicles is an autonomous vehicle. The method where the vehicle is a leader of the vehicular micro cloud and controls when the set of member vehicles leave the vehicular micro cloud. The method where the vehicle is a leader of the vehicular micro cloud and determines how to use the pool of vehicular computing resources to complete a set of tasks in an order for the set of member vehicles and the order is determined based on a set of factors that includes safety. The method where the set of tasks does not include a task for the leader. The method where the vehicle is a leader of the vehicular micro cloud and determines to dissolve the vehicular micro cloud responsive to determining that sensor measurements indicate that the queue is no longer present in the roadway environment. The method where the pool of vehicular computing resources includes a group including of the following for the set of member vehicles: unused processing power; unused memory; unused sensors; and unused bandwidth. Implementations of the described techniques may include hardware, a method or process, or computer software on a computer-accessible medium.

One general aspect includes a computer program product included in an onboard vehicle computer including computer code that is operable, when executed by the onboard vehicle computer, to cause the onboard vehicle computer to execute steps including: determining that a queue is present in a roadway environment and that a vehicle that includes the onboard vehicle computer is present in the queue; causing a set of member vehicles to form a vehicular micro cloud in the roadway environment responsive to determining that the queue is present in the roadway environment so that determining that the queue is present triggers a formation of the vehicular micro cloud, where the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles; and controlling when specific members of the set of member vehicles leave the vehicular micro cloud. Other embodiments of this aspect include corresponding computer systems, apparatus, and computer programs recorded on one or more computer storage devices, each configured to perform the actions of the methods.

Implementations may include one or more of the following features. The computer program product where the controlling when specific members of the set of member vehicles leave the vehicular micro cloud is based on digital data that describes how long the specific members will be in a geographic area that is served by the vehicular micro cloud and an amount of time needed for the specific members to complete a set of tasks for the vehicular micro cloud which are assigned to them by the vehicle that includes the onboard vehicle computer. Implementations of the described techniques may include hardware, a method or process, or computer software on a computer-accessible medium.

One general aspect includes a system including: an ego vehicle including a communication unit that is communicatively coupled to a processor, where the processor is executing computer-executable code that is operable, when executed by the processor, to cause the processor to: determine that a queue is present in a roadway environment and that a vehicle that includes processor is present in the queue; and causing a set of member vehicles to form a vehicular micro cloud in the roadway environment responsive to determining that the queue is present in the roadway environment so that determining that the queue is present triggers a formation of the vehicular micro cloud, where the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles. Other embodiments of this aspect include corresponding computer systems, apparatus, and computer programs recorded on one or more computer storage devices, each configured to perform the actions of the methods.

Implementations may include one or more of the following features. The system where the set of member vehicles execute a remedial action to respond to a presence of the queue. The system where the set of member vehicles includes a sub-set of autonomous vehicles and autonomous driving systems of the sub-set of autonomous vehicles modify their operation in order to respond to the queue and conform to a set of goals of a driving plan being executed by the autonomous driving systems. The system where none of the set of member vehicles is an autonomous vehicle. The system where the vehicle is a leader of the vehicular micro cloud and controls when the set of member vehicles leave the vehicular micro cloud. The system where the vehicle is a leader of the vehicular micro cloud and determines how to use the pool of vehicular computing resources to complete a set of tasks in an order for the set of member vehicles and the order is determined based on a set of factors that includes safety. The system where the set of tasks does not include a task for the leader. The system where the vehicle is a leader of the vehicular micro cloud and determines to dissolve the vehicular micro cloud responsive to determining that sensor measurements indicate that the queue is no longer present in the roadway environment. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
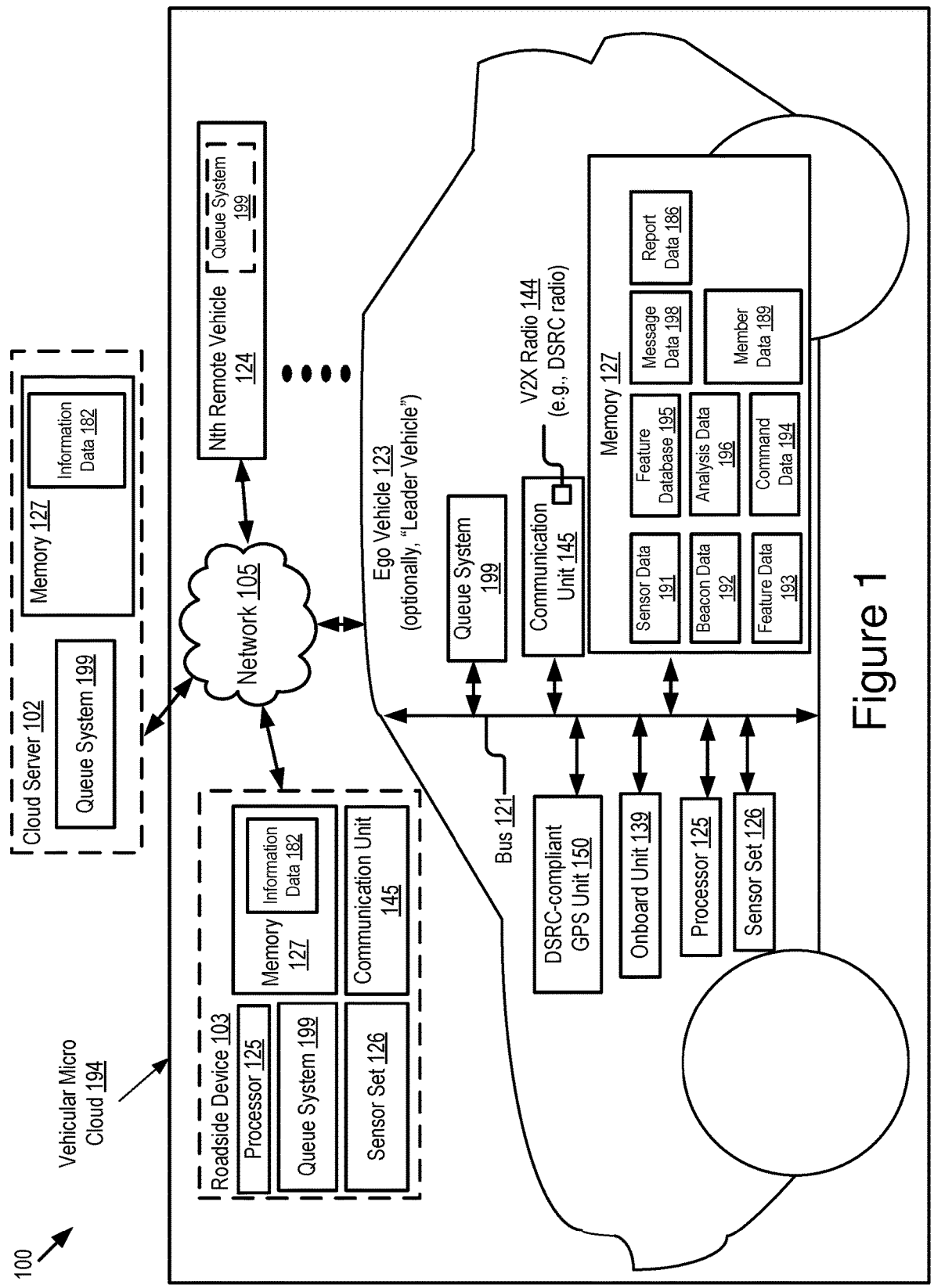
FIG. 1 is a block diagram illustrating an operating environment for a queue system according to some embodiments.

Our invention is motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIG. 3) together in parallel by a cooperative process. Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; a roadside device; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as a roadside device.

As used herein, the term "vehicle" refers to a connected vehicle. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

A problem is that vehicles are frequently stuck in a queue. For example, vehicles are stuck in a queue in the following example situations: waiting at an intersection; waiting at a traffic light; entering an on-ramp; exiting an off-ramp; waiting to enter a parking lot or parking garage; etc. Other examples are possible. The embodiments of the queue system described herein solve this problem.

Described herein are embodiments of a queue system. In some embodiments, the queue system improves the performance of a vehicular micro cloud because it beneficially enables the vehicular micro cloud to determine some or all of the following information for an ego vehicle: (1) whether the ego vehicle is stuck in a queue; (2) why the queue is formed; (3) the location of the head of the queue relative to location of the ego vehicle; and (4) an estimated wait time in the queue for the ego vehicle. The ego vehicle may be a human-driven vehicle or an autonomous vehicle. If the ego vehicle is a human-driven vehicle, then in some embodiments the queue system informs the driver of the ego vehicle about the information listed above. For example, the queue system causes a display, speaker, or actuator of the ego vehicle to provide one or more of the following: a visual notification that describes the information; an auditory notification that describes the information; an audio-visual notification that describes the information; a haptic signal having a meaning known to the driver; and some other type of notification. If the ego vehicle is an autonomous vehicle, then in some embodiments the queue system informs the autonomous driving system about the information listed above (e.g., a feedback signal provided to the autonomous driving system that includes digital data describing the information).

Accordingly, the queue system improves the performance of a vehicle by enabling it to inform either the driver or the autonomous driving system about information relevant to a queue that they are stuck in so that they can make better decisions about how to respond to the presence of the queue.

In some embodiments, the queue system improves the performance of a vehicular micro cloud by using the occurrence of a queue to dynamically trigger the formation of a vehicular micro cloud, thereby beneficially enabling vehicular micro clouds to be spawned at geographic locations where they are most beneficial and a threshold of vehicles necessary to form vehicular micro clouds would naturally be present (e.g., the vehicles in the queue ensures that the threshold of vehicles necessary to form the vehicular micro cloud is met).

Examples of the queue system are now described according to some embodiments. In some embodiments, the queue system is software that is operable to improve the performance of a vehicular micro cloud by detecting the presence of a queue and causing a vehicular micro cloud to be formed. In some embodiments, the queue system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud.

The ego vehicle and the remote vehicles may be human-driven vehicles, autonomous vehicles, or a combination of human-driven vehicles and autonomous vehicles. In some embodiments, the ego vehicle and the remote vehicles may be equipped with Dedicated Short-Range Communication (DSRC) equipment such as a GPS unit that has lane-level accuracy and a DSRC radio that is capable of transmitting DSRC messages.

Example General Method

As described above, in some embodiments the queue system is installed in an onboard unit of an ego vehicle. In some embodiments, the queue system includes code and routines that are operable, when executed by the onboard unit, to cause the onboard unit to execute one or more steps of the following example general method:

Step 1: The queue system causes the onboard sensors to record sensor data. The sensor data is digital data describing an environment of the vehicle and information about the vehicle itself such as its: (1) geographic location at one or more times; (2) acceleration at one or more times; (3) speed at one or more times; (4) heading at one or more times; (5) path history over time, etc. In some embodiments, this step is executed by the ego vehicle and the remote vehicles, which all include an instance of the queue system in these embodiments. Some or all of these vehicles may be located in a queue. If so, the sensor data for these vehicles are collectively analyzable to determine that the vehicles are located in a queue. An example of the sensor data includes the sensor data 191 depicted in FIG. 1.

Step 2: The queue system generates a beacon message based on the sensor data. The beacon message is a V2X message that includes beacon data as its payload or part of its payload. The beacon data is digital data that describes, among other things, one or more of the following about the vehicle that generates the beacon message: (1) it's geographic location at one or more times; (2) it's acceleration at one or more times; (3) it's speed at one or more times; (4) it's heading at one or more times; (5) it's path history over time, etc. In some embodiments, this step is executed by the ego vehicle and the remote vehicles, which all include an instance of the queue system in these embodiments. An example of the beacon data includes the beacon data 192 depicted in FIG. 1.

Step 3: The queue system controls the operation of the communication unit to cause the communication unit to transmit the beacon message. The beacon message is broadcast and not unicast. The beacon message may be a Basic Safety Message (BSM) or a Cooperative Awareness Message (CAM) which is executed at a regular interval (e.g., once every 0.10 seconds). The beacon data may be included in part 2 of the BSM data which is included in the BSM. The interval for transmitting the BSMs may be user configurable. The vehicles that transmit the beacon message are in a same geographic region. For example, they may all be located in a same queue or driving past a queue. In some embodiments, this step is executed by the ego vehicle and the remote vehicles, which all include an instance of the queue system in these embodiments. Each of these vehicles includes their own instance of the queue systems and their own communication units which are operable to send and receive V2X messages.

Step 4: The queue system of the ego vehicle controls the operation of the communication unit of the ego vehicle to receive a beacon message and parse out the beacon data from the beacon message. In some embodiments, this step is repeated for each of the beacon messages received by the ego vehicle.

Step 5: The queue system analyzes the beacon data to extract feature data. The feature data is digital data that describes a set of queue features. Queue features are features that indicate the presence of a queue. For example, the queue describes a set of vehicles located in a sequence one after another in a lane of a roadway and traveling at similar low-paced speeds over a period of time, or not traveling at all over the period of time. The memory of the vehicle may already store a feature database. The feature database is a data structure that includes a historical set of feature data that describes various types of queues in various types of environments. Accordingly, the feature database beneficially allows the queue system to compare the feature data to the feature database and determine the presence of a queue. An example of the feature data and the feature database includes the feature data 193 and the feature database 195, respectively, depicted in FIG. 1. In some embodiments, this step is repeated for each of the beacon messages received at step 4.

Step 6: The queue system determines a presence of a queue. This step may be done by the queue system based on an analysis of the feature data alone or a comparison, by the queue system, of the feature data to the feature database. This analysis may also be done in consideration of the sensor data of the vehicle itself generated at step 1 in combination with the beacon data received from other vehicles.

Step 7: The queue system determines if the memory of the vehicle stores a feature database. If the memory does not already store a feature database, the queue system uses the feature data extracted at step 5 to begin creating a feature database at step 7. If the memory does already store a feature database, then the queue system updates the feature database to include the newly extracted feature data.

Step 8: Responsive to determining a presence of the queue at step 6, the queue system generates and transmits a command message. The command message is broadcast and not unicast. The command message includes command data. The command data is digital data that instructs the vehicles that receive it to form a vehicular micro cloud. An example of the command data includes the command data 194 depicted in FIG. 1.

In some embodiments, the ego vehicle may be leader of the vehicular micro cloud or some other vehicle may be the leader of the vehicular micro cloud. The beacon data may include digital data describing the unused computing resources of each vehicle and this beacon data may be used to determine which of the vehicles that transmitted a beacon message, as well as the ego vehicle, should be the leader of the vehicular micro cloud. The command data may include digital data that describes which of the vehicles should be the leader of the vehicular micro cloud. Alternatively, the vehicular micro cloud may be leaderless, or the leader of the vehicular micro cloud may be determined in some other fashion. A definition of a leader vehicle, according to some embodiments, is provided below the description of step 15.

Step 9: The queue system controls the operation of a communication unit to receive a report message from one or more connected vehicles in a same or similar geographic region. In some embodiments, the report message is a V2X message that includes report data. In some embodiments, the report data is digital data that describes one or more of the following about the vehicle that transmitted the report message: hardware configuration; trustworthiness; unused processing power; unused memory; whether the vehicle is capable of transmitting and receiving V2X messages; the types of V2X messages the vehicle is capable of transmitting and receiving; the V2X services the vehicle is capable of providing; the geographic location of the vehicle; the destination of the vehicle; the heading of the vehicle; the speed of the vehicle; and the path history of the vehicle. An example of the report data includes the report data 186 depicted in FIG. 1.

Step 10: The vehicles that form the vehicular micro cloud are referred to as "members" of the vehicular micro cloud. The queue systems of the members control the operation of the communication units of the members (e.g., the ego vehicle and the remote vehicles that are members) to cause the members to exchange V2X messages to share feature data extracted at step 5 with one another. The feature data extracted at step 5 by each member is the payload for the V2X messages transmitted at step 10. In some embodiments, the V2X messages at step 10 are V2V messages. An example of the feature data includes the feature data 193 depicted in FIG. 1.

Step 11: One or more queue systems of the members control the operation of one or more of the communication units, memories and onboard vehicle computers of the members to cause the members to share computer resources with one another using V2X messages so that they collectively or individually determine analysis data based on the feature data shared at step 10. In some embodiments, the analysis data is digital data that describes one or more of the following: (1) why the queue is formed; (2) the location of the head of the queue relative to the locations of the individual members; and (3) an estimated wait time in the queue for each of the members. An example of the analysis data includes the analysis data 196 depicted in FIG. 1.

Step 12: One or more queue systems of the members control the operation of one or more of the communication units of the members to cause the members to transmit V2X messages and share analysis data with one another. The analysis data is the payload for the V2X messages. In some embodiments, the V2X messages at step 12 are V2V messages. In some embodiments, the members share analysis data with one another by providing the analysis data to a leader of the vehicular micro cloud which then distributes the analysis data to the other members via V2X communications with the members. The leader may execute step 13 and provide the members with the output of step 13. An example of the analysis data includes the analysis data 196 depicted in FIG. 1.

Step 13: The members individually or collectively determine how to respond to the queue based on their collective or individual goals. This step may include human-driven vehicles that are members generating a graphical display or some other informative output to inform their drivers about the presence of the queue. This step may also include the autonomous driving systems of autonomous vehicles that are members modifying their operation in order to respond to the queue and conform to the goals of a driving plan.

In some embodiments, step 13 includes one or more queue systems of the members analyzing the analysis data to determine, based on this analysis, how to respond to the queue based on the collective or individual goals of the members. The goals may be described by any of the digital data previously described as being exchanged among the members of the vehicular micro cloud.

Step 14: One or more of the queue systems of the members control the operation of the sensor sets and communication units of the members to cause the sensor sets and communication units to continuously record sensor data, generate beacon data, and share beacon messages with another via V2X communication or by way of a leader vehicle of the vehicular micro cloud, extract features from the beacon data, share the feature data with one another, and analyze the feature data to determine: (1) whether a queue is still present; (2) why the queue is formed; (3) the location of the head of the queue relative to the locations of the individual members; and (4) an estimated wait time in the queue for each of the members. This feature data is shared with the other members by the one or more queue systems using V2X communication or by way of a vehicular micro cloud leader.

Step 15: When step 13 indicates that the queue is no longer present, the queue system of a leader of the vehicular micro cloud (e.g., the ego vehicle) causes the vehicular micro cloud to dissolve or terminate operation. The vehicular micro cloud is dissolved by the queue system of the leader vehicle causing the communication unit of the leader vehicle to transmit a second command message including message data describing a command to dissolve the vehicular micro cloud. An example of the message data includes the message data 198 depicted in FIG. 1.

Optionally, an instance of the queue system is also installed in a cloud server or an edge server that is communicatively coupled to the same wireless network as a vehicle (e.g., the ego vehicle) that also includes an instance of the queue system installed in its ECU.

Leader Vehicle

Figure 3:
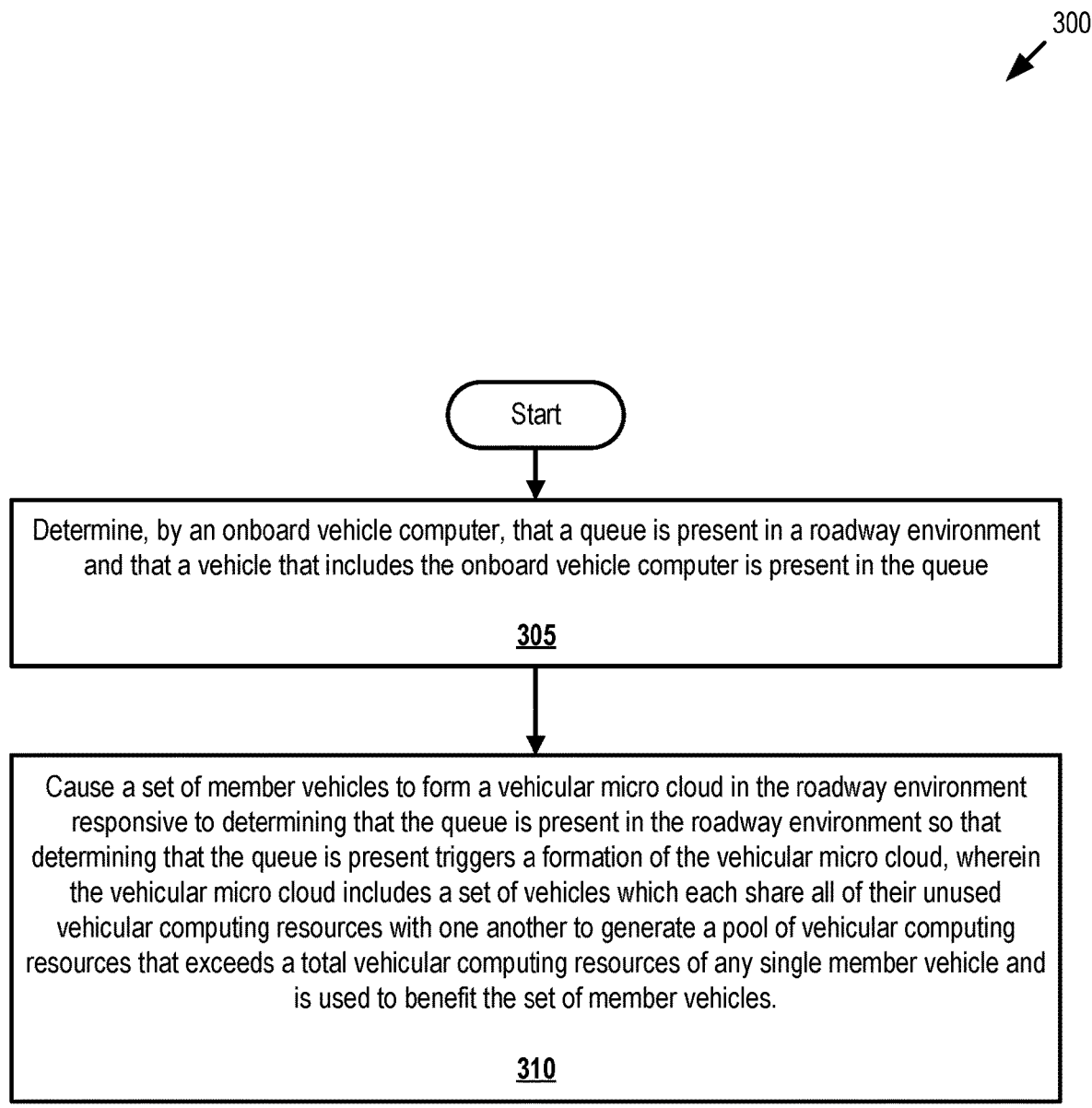
FIG. 3 is a flowchart of an example method for forming a vehicular micro cloud responsive to identifying a presence of a queue according to some embodiments.

In some embodiments, a method executed by the queue system (e.g., the example general method described above or some other method such as that depicted in FIG. 3) includes a leader vehicle. For example, the vehicular micro cloud formed by the queue system includes a leader vehicle that provides the following example functionality: controlling when the set of member vehicles leave the vehicular micro cloud (i.e., managing the membership of the vehicular micro cloud, such as who can join, when they can join, when they can leave, etc.); determining how to use the pool of vehicular computing resources to complete a set of tasks in an order for the set of member vehicles wherein the order is determined based on a set of factors that includes safety; determining how to use the pool of vehicular computing resources to complete a set of tasks that do not include any tasks that benefit the leader vehicle; and determining when no more tasks need to be completed, or when no other member vehicles are present except for the leader vehicle, and taking steps to dissolve the vehicular micro cloud responsive to such determinations.

In some embodiments, the leader vehicle is determined by the queue system based on a set of factors that indicate which vehicle (e.g., the ego vehicle or one of the remote vehicles) is the most technologically sophisticated. For example, the member vehicle that has the fastest onboard computer may be the leader vehicle. Other factors that may qualify a vehicle to be the leader is having the most accurate sensors, most bandwidth, and most memory. Accordingly, the designation of which vehicle is the leader vehicle may be based on a set of factors that includes which vehicle has: (1) the fastest onboard computer; (2) the most accurate sensors; (3) the most bandwidth or other network factors such having radios compliant with the most modern network protocols; and (4) most available memory.

In some embodiments, the designation of which vehicle is the leader vehicle changes over time if a more technologically sophisticated vehicle joins the vehicular micro cloud. Accordingly, the designation of which vehicle is the leader vehicle is dynamic and not static. In other words, the designation of which vehicle is the leader vehicle can change on the fly if a "better" leader vehicle joins the vehicular micro cloud.

In some embodiments, the leader vehicle is whichever member vehicle of a vehicular micro cloud has a fastest onboard computer.

Priority Treatment of Safety Critical Scenarios:

In some embodiments, the queue system always considers safety when determining the order and speed in which tasks are completed. Safety critical scenarios are always completed first relative to other tasks (e.g., if eight vehicles have tasks that need to be completed, then the safety critical tasks will be completed first and/or will be allocated more computing resources relative to the other tasks). In some embodiments, the queue system calculates how quickly a safety critical scenario needs to be addressed and attempts to allocate enough computing resources so that the event which causes the safety critical scenario does not happen or is mitigated as much as possible (e.g., the queue system calculates that a collision will occur in two seconds and attempts to allocate enough computing resources to determine a driving maneuver that will either prevent the collision from occurring or minimize the impact of the collision).

Example Benefits

Example benefits of the queue system relative to the existing solutions are now described according to some embodiments.

In some embodiments, the queue system is operable to provide its functionality to operating environments and network architectures that do not include a server. Use of servers is problematic because they create latency. For example, some prior art systems require that groups of vehicles relay all their messages to one another through a server. This is particularly problematic and prone to latency which renders the solution inoperable in real-world scenarios, especially for safety critical scenarios. By comparison, the use of server is an optional feature of the queue system. Indeed, the preferred embodiment would not include a server since, for example: (1) inclusion of a server leads to undesirable latency; and (2) the computational power of the server is not needed by the vehicular micro clouds because the whole point of vehicular micro clouds is to harness the unused computational abilities of the fleet of vehicles that are on the roadway at any given time.

In some embodiments, the queue system is operable to provide its functionality even though the vehicle which includes the queue system does not have a Wi-Fi antenna as part of its communication unit. By comparison, some of the existing solutions require the use of a Wi-Fi antenna in order to provide their functionality. Because the queue system does not require a Wi-Fi antenna, it is able to provide its functionality to more vehicles, including older vehicles without Wi-Fi antennas.

In some embodiments, the queue system is operable to provide its functionality even though the vehicle which includes the queue system does not have a DSRC radio as part of its communication unit. By comparison, some of the existing solutions require the use of a DSRC radio in order to provide their functionality. Because the queue system does not require a DSRC radio, it is able to provide its functionality to more vehicles, including older vehicles without DSRC radios.

In some embodiments, the queue system includes code and routines that, when executed by a processor, cause the processor to form a vehicular micro cloud responsive to determining that a queue is present in a geographic area. Some solutions discuss forming "cliques," but cliques are not vehicular micro clouds because they require that wireless messages be relayed through a server. The existing solutions do not disclose or suggest that the presence of a queue may be used as a trigger or threshold event for the formation of a vehicular micro cloud, which does not include a server in some embodiments.

In some embodiments, the queue system includes code and routines that, when executed by a processor, cause the processor to dissolve a vehicular micro cloud responsive to determining that a queue is no longer present in a geographic area. The existing solutions do not disclose or suggest dissolving a vehicular micro cloud responsive to determining that a queue is no longer present in a geographic area.

In some embodiments, the queue system includes code and routines that, when executed by a processor, cause the processor to identify the absence of a queue, where one was previously present, which then triggers the queue system to take steps which result in the queue system dissolving the vehicular micro cloud. The absence of the queue may also serve as satisfying a threshold for dissolving the queue. The existing solutions do not disclose or suggest that the absence of a queue, where one was previously present, may serve as a trigger or threshold event for dissolving a vehicular micro cloud.

In some embodiments, the queue system includes code and routines that, when executed by a processor, cause the processor to control when a member of the vehicular micro cloud may leave or exit the vehicular micro cloud. This approach is beneficial because it means the leader vehicle has certainty about how much computing resources it has at any given time since it controls when vehicles (and their computing resources) may leave the vehicular micro cloud. The existing solutions do not provide this functionality.

In some embodiments, the queue system includes code and routines that, when executed by a processor, cause the processor to designate a particular vehicle to serve as a leader vehicle responsive to determining that the particular vehicle has sufficient unused computing resources and trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the queue system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the queue system is configured so that a particular vehicle (e.g., the ego vehicle) is pre-designated by a vehicle manufacturer to serve as a leader vehicle for any vehicular micro cloud that it joins. The existing approaches do not provide this functionality.

With regards to leader vehicles, the existing solutions do not disclose or suggest that a vehicular micro cloud includes a leader vehicle that provides the following functionality: (1) controlling when the set of member vehicles leave the vehicular micro cloud; (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the leader vehicle; or (4) determining when the queue is no longer present and taking steps to dissolve the vehicular micro cloud.

The existing solutions do not disclose or suggest that the leader vehicle is whichever member vehicle that has the fastest onboard computer. The existing solutions also do not disclose or suggest that the designation of which vehicle is the leader vehicle may be based on a set of factors that includes which member vehicle has: the fastest onboard computer; most accurate sensors; most bandwidth or other network factors; and most available memory. The existing solutions also do not disclose or suggest that the designation of which vehicle is the leader vehicle may change over time if a more technologically sophisticated vehicle joins the vehicular micro cloud.

In some embodiments, the leader vehicle always uses the unused computing resources to benefit the members of the vehicular micro cloud, and not just for the benefit of the leader vehicle itself.

In some embodiments, the queue system always considers safety when determining the order and speed in which tasks are completed. Safety critical scenarios are always completed first relative to other tasks (e.g., if eight vehicles have tasks that need to be completed, then the safety critical tasks will be completed first and/or will be allocated more computing resources relative to the other tasks). The queue system also calculates how quickly a safety critical scenario needs to be addressed and attempts to allocate enough computing resources so that the event which causes the safety critical scenario does not happen or is mitigated as much as possible (e.g., the queue system calculates that a collision will occur in two seconds and attempts to allocate enough computing resources to determine a driving maneuver that will either prevent the collision from occurring or minimize the impact of the collision).

Vehicular Micro Clouds

The existing solutions generally do not include vehicular micro clouds. Many groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a sever or whose functionality incorporates a server is not a vehicular micro cloud.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does not serve the purpose of harnessing the unused computing resources of many different vehicles to perform complex computational tasks that a single vehicle alone cannot perform is not a vehicular micro cloud.

In some embodiments, the vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. In some embodiments, a leader of a vehicular micro cloud is pre-designated by a vehicle manufacturer by the inclusion of one a bit or a token in a memory of the vehicle that designates the vehicle as the leader of all vehicular micro clouds which it joins.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the example general method described above or the method depicted in FIG. 3) may be executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

A vehicular micro cloud may include vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the queue system, the server is an optional feature of the operating environment. An example of a preferred embodiment of the queue system does not include the server in the operating environment which includes the queue system.

In some embodiments, the queue system enables a group of vehicles to perform computationally expensive tasks that could not be completed by any one vehicle in isolation.

Example Operating Environment

The queue system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the queue system includes software installed in an onboard unit of a connected vehicle or an onboard computer of a roadside device such as a Roadside Unit (RSU). This software is the "queue system" described herein.

An example operating environment for the embodiments described herein includes an ego vehicle and at least one remote vehicle. The ego vehicle and the remote vehicle are both connected vehicles having communication units that enable them to send and receive wireless messages via one or more vehicular networks. In some embodiments, both the ego vehicle and the remote vehicle include an onboard unit having a queue system stored therein. An example of a preferred embodiment of the queue system includes a serverless operating environment which does not include a server.

In some embodiments, the queue system includes code and routines that are operable, when executed by a processor of the onboard unit, to cause the processor to execute one or more of the steps of the example general method which was described above and/or the method 300 depicted in FIG. 3.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

In some embodiments, the vehicle that includes the queue system 199 also includes a V2X radio which is communicatively coupled to the queue system 199. The queue system 199 is operable to control the operation of the V2X radio and provide its functionality using V2X messages received via the V2X radio. In some of these embodiments, some or all of the digital data depicted in FIG. 1 is the payload for one or more V2X messages. In some embodiments, the V2X is a Basic Safety Message (BSM).

In some embodiments, the connected vehicle described herein, and depicted in FIG. 1, includes a V2X radio instead of a DSRC radio. In these embodiments, all instances of the term "DSRC" as used in this description may be replaced by the term "V2X." For example, the term "DSRC radio" is replaced by the term "V2X radio," the term "DSRC message" is replaced by the term "V2X message," and so on.

Embodiments of the queue system are now described. Referring now to FIG. 1, depicted is a block diagram illustrating an operating environment 100 for a queue system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a roadside device 103; an Nth remote vehicle 124 (where "N" refers to any positive whole number greater than one); and a cloud server 102. These elements of the operating environment 100 are depicted by way of illustration. In practice, the operating environment 100 may include one or more of the elements depicted in FIG. 1. The Nth remote vehicle 124 may be referred to as a remote vehicle 124.

In some embodiments, the ego vehicle 123, the remote vehicle 124, the network 105, and the roadside device 103 may be elements of a vehicular micro cloud 194. The cloud server 102 is not an element of the vehicular micro cloud 194. The cloud server 102 and the roadside device 103 are depicted in FIG. 1 with a dashed line to indicate that they are optional features of the operating environment 100.

In the depicted embodiment, the ego vehicle 123, the remote vehicle 124, and the roadside device 103 include similar elements. For example, each of these elements of the operating environment 100 include their own processor 125, bus 121, memory 127, communication unit 145, processor 125, sensor set 126, and queue system 199. These elements of the ego vehicle 123, the remote vehicle 124, and the roadside device 103 provide the same or similar functionality relative to one another. Accordingly, these descriptions will not be repeated in this description.

In the depicted embodiment, the ego vehicle 123, remote vehicle 124, and the roadside device 103 may each store similar digital data. The information data 182 depicted as elements of the roadside device 103 and the cloud server 102 includes some or all of the digital data depicted in FIG. 1 as stored in the memory 127 of the ego vehicle 123.

The cloud server 102 and the roadside device 103 are depicted in FIG. 1 using dashed lines to indicate that they are optional features of the operating environment 100.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. Each of the ego vehicle 123, roadside device 103 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, a vehicular micro cloud and a micro-vehicular cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The leader vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the roadside device 103, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, the memory 127 of one or more of the endpoints stores member data 189. The member data 189 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 189 describes logical associations between endpoints which are a necessary component of the vehicular micro cloud 194 and serves to differentiate the vehicular micro cloud 194 from a mere V2X network. In some embodiments, a vehicular micro cloud 194 must include a leader vehicle and this is a further differentiation from a vehicular micro cloud 194 and a V2X network or a group or clique of vehicles which is not a vehicular micro cloud 194.

The vehicular micro cloud 194 does not include a hardware server. Accordingly, the vehicular micro cloud 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data 189. The network 105 also does not include a leader vehicle.

In some embodiments, one or more of the ego vehicle 123 and the remote vehicle 124 are DSRC-equipped vehicles. In some embodiments, the roadside device 103 is a DSRC-equipped device. For example, the ego vehicle 123 includes a DSRC-compliant GPS unit 150 and a DSRC radio (e.g., the V2X radio 144 is a DSRC radio in embodiments where the ego vehicle 123 is a DSRC-equipped vehicle) and the roadside device 103 includes a communication unit 145 having a DSRC radio similar to the one included in the ego vehicle 123. The network 105 may include a DSRC communication channel shared among the ego vehicle 123 and a second vehicle.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a DSRC-compliant GPS unit 150; a communication unit 145; an onboard unit 139; a memory 127; and a queue system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the queue system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes images or other measurements of the physical environment and objects or other vehicles present in the roadway environment such as pedestrians, animals, traffic signs, traffic lights, potholes, etc.

The physical environment may include a roadway region, parking lot, or parking garage that is proximate to the ego vehicle 123. The sensor data 191 may describe measurable aspects of the physical environment.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate the other digital data stored by the memory 127.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the DSRC-compliant GPS unit 150.

In some embodiments, the GPS data describes a location of a queue with lane-level accuracy.

An example process for generating GPS data describing a geographic location of an object (e.g., a queue, the ego vehicle 123, the remote vehicle 124, or some other object located in a roadway environment) is now described according to some embodiments. In some embodiments, the queue system 199 include code and routines that are operable, when executed by the processor 125, to cause the processor to: analyze (1) GPS data describing the geographic location of the ego vehicle 123 and (2) sensor data 191 describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the DSRC-compliant GPS unit 150 includes hardware that wirelessly communicates with a GPS satellite (or GPS server) to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the queue system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on a roadway at the same time.

By comparison to the DSRC-compliant GPS unit 150, a conventional GPS unit which is not compliant with the DSRC standard is unable to determine the location of a vehicle (e.g., the ego vehicle 123) with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the queue system 199 to determine the lane of travel of the ego vehicle 123. This measurement improves the accuracy of the GPS data describing the location of parking spaces used by the queue system 199 when providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the parking space is digital data that describes a geographic location of an object. One or more of these two types of GPS data may have lane-level accuracy. In some embodiments, one or more of these two types of GPS data are described by the sensor data 191.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the queue system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002

Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message. Currently, 75 MHz of the 5.9 GHz band is designated for DSRC. However, in some embodiments, a 30 MHz portion of the 5.9 GHz band is reserved by a jurisdiction for V2X. In these embodiments, the V2X radio 144 is communicatively coupled to the queue system 199 and the queue system 199 is operable to control the operation of the V2X radio and provide its functionality using V2X messages received via the V2X radio. In some embodiments, some or all of the wireless messages described above with reference to the example general method or below with reference to the method 300 depicted in FIG. 3 are transmitted by the V2X radio 144 on a 30 MHz portion of the 5.9 GHz band (e.g., 5.895-5.925 GHz) as directed by the queue system 199. In this way, the queue system 199 provides its functionality using the V2X messages sent or received via the 30 MHz portion of the 5.9 GHz band.

In some embodiments, the V2X radio 144 is a C-V2X radio that is operable to send and receive C-V2X messages. In some embodiments, some or all of the wireless messages described above with reference to the example general method or below with reference to the method 300 depicted in FIG. 3 are transmitted by the C-V2X radio on the upper 30 MHz of the 5.9 GHz band (e.g., 5.895-5.925 GHz) as directed by the queue system 199.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Message ("BSM message" if singular, or "BSM messages" if plural). In some embodiments, the non-transitory memory stores a buffered version of the GPS data for the ego vehicle 123 so that the GPS data for the ego vehicle 123 is broadcast as an element of the BSM messages which are regularly broadcast by the V2X radio 144 (e.g., at an interval of once every 0.10 seconds).

In some embodiments, the V2X radio 144 includes any hardware or software which is necessary to make the ego vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the beacon data 192; the feature data 193; the command data 194; the feature database 195; the analysis data 196; the message data 198; the member data 189; and the report data 186. These elements of the memory were described above with reference to the example general method, and so, those descriptions will not be repeated here.

In some embodiments, the queue system 199 of the leader vehicle receives service requests from micro cloud members and provides vehicular micro cloud services that are consistent with these requests. The service data is digital data that is an output of a vehicular micro cloud service. For example, the service data is an output of a computational process executed by the vehicular micro cloud 194. The queue system 199 transmits a V2X message to the micro cloud member that requested the computational process and the V2X message includes service data descripting the output of these computational processes as a component of its payload. In this way the queue system enables the leader vehicle to serve as a leader vehicle by providing vehicular micro cloud services to the members of the vehicular micro cloud. In some embodiments, the queue system 199 offers computational services, communication services, and data storage services to micro cloud members that have limited computational resources when compared to the leader vehicle. In some embodiments, the service data is the output or byproduct of these computational services, communication services, and data storage services.

In some embodiments, the service data includes digital data that describes a set of computational tasks ("tasks") that are to be completed by the vehicular micro cloud 194. Each computational task may be subdivided into a set of subtasks. In some embodiments, the service data is transmitted to the ego vehicle 123 via the network 105. The service data may include digital data that describes a task to be completed.

In some embodiments, the queue system 199 includes code and routines that are operable, when executed by the processor 125, to execute one or more steps of one or more of the method 300 described herein with reference to FIG. 3. In some embodiments, the queue system 199 includes code and routines that are operable, when executed by the processor 125, to execute one or more steps of the example general method described above.

In some embodiments, the queue system 199 is an element of the onboard unit 139 or some other onboard vehicle computer.

In some embodiments, the queue system 199 is implemented using hardware including a field-programmable gate array ("FPGA") or an application-specific integrated circuit ("ASIC"). In some other embodiments, the queue system 199 is implemented using a combination of hardware and software.

In some embodiments, the roadside device 103 is a device that (1) includes a communication unit 145 and a processor 125 and (2) is present in an environment (e.g., a roadway environment) with the ego vehicle 123. For example, the roadside device 103 is a roadside unit (RSU) or some other infrastructure device including the communication unit 145 and the processor 125 and present in the same environment as the ego vehicle 123.

As depicted, the roadside device 103 includes the following elements: a memory 127; a bus 121; a processor 125; a communication unit 145; a sensor set 126; and a queue system 199. These elements of the roadside device 103 provide similar functionality as those described above for the ego vehicle 123, and so, these descriptions will not be repeated here.

In some embodiments, the roadside device 103 is not an element of the vehicular micro cloud 194. In some embodiments, the roadside device 103 does not include a server.

The remote vehicle 124 includes elements and functionality which are similar to those described above for the ego vehicle 123, and so, those descriptions will not be repeated here. In some embodiments, the ego vehicle 123 and the remote vehicle 124 are located in a geographic region which is managed by the roadside device 103. For example, the roadside device 103 is a stationary connected device that is responsible for establishing and maintaining stationary vehicular micro clouds at a particular geographic location or within a particular geographic region that includes the geographic locations described by the GPS data of the ego vehicle 123, the remote vehicle 124, and the roadside device 103.

In some embodiments, the memory 127 of the roadside device 103 stores information data 182. The information data 182 is digital data that includes some or all of the digital data depicted in FIG. 1 as stored in the memory 127 of the ego vehicle 123.

The cloud server 102 is a connected processor-based computing device that is not a member of the vehicular micro cloud 194 and includes an instance of the queue system 199 and a memory 127.

In some embodiments, the memory 127 stores the information data 182. In some embodiments, one or more of the cloud server 102, the roadside device 103, the ego vehicle 123, and the remote vehicle 124 store the information data 182. Accordingly, some or all of these endpoints may store their own instances of the information data 182. The information data 182 stored across multiple endpoints of the network 105 may include different types and/or versions (e.g., time-based versions) of the digital data depicted in FIG. 1 as being stored by the memory 127 of the ego vehicle 123. Accordingly, the information data 182 stored by the cloud server 102 at time t may be different than the information data 182 stored by the roadside device 103 at the time t.

In some embodiments, the cloud server 102 is one or more of the following: a hardware server; a personal computer; a laptop; a device such as the roadside device 103 which is not a member of the vehicular micro cloud 194; or any other processor-based connected device that is not a member of the vehicular micro cloud 194 and includes an instance of the queue system 199 and a non-transitory memory that stores at least one instance of the information data 182. The cloud server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123 and the remote vehicle 124), and optionally devices such as the roadside device 103, form a cluster of interconnected vehicles that are located at a same geographic region. These connected vehicles (and, optionally, connected devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 102. Connected vehicles (and devices such as the roadside device 103) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the queue system 199 includes encryption keys for encrypting wireless messages and decrypting the wireless messages described herein.

Figure 2:
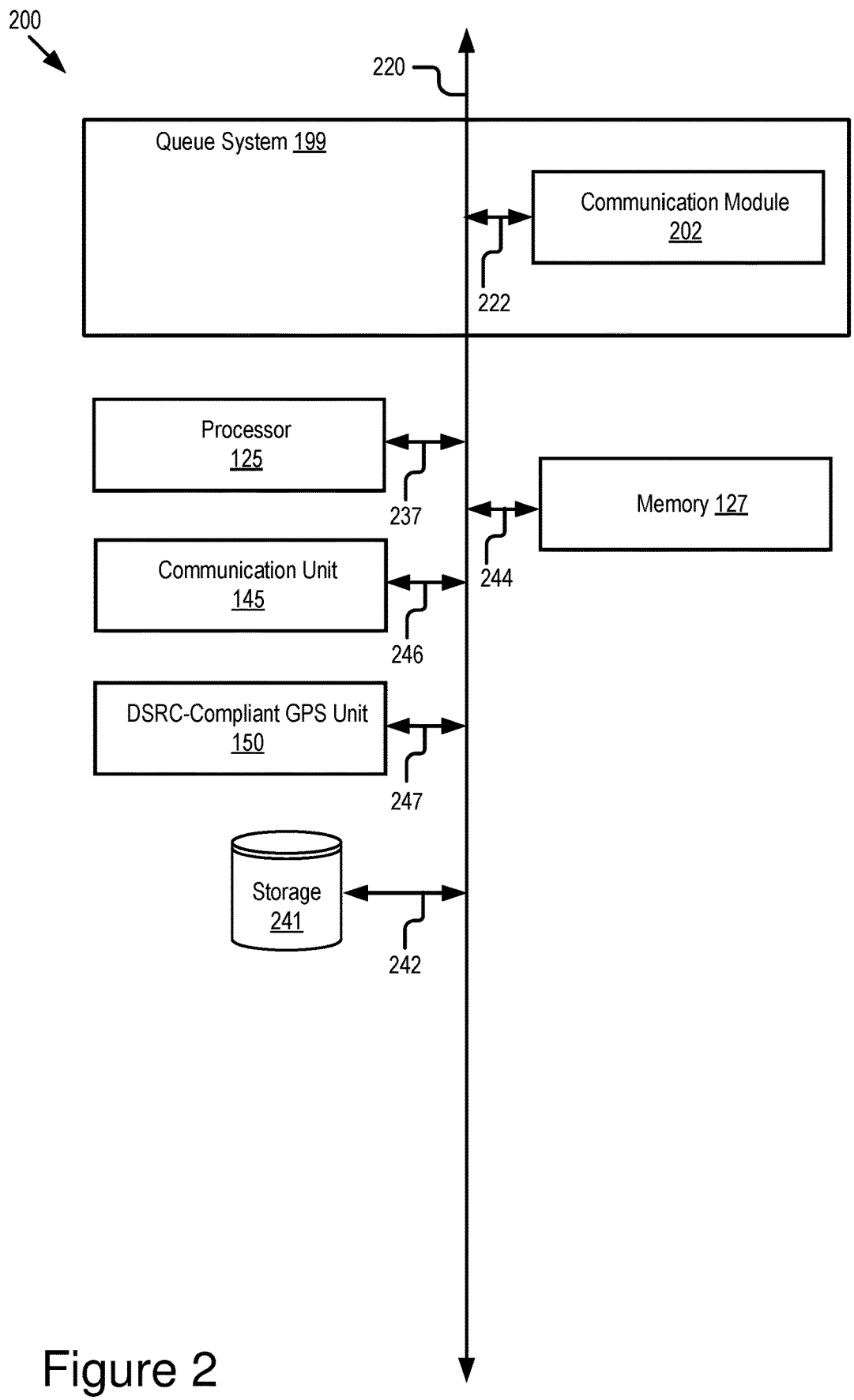
FIG. 2 is a block diagram illustrating an example computer system including a queue system according to some embodiments.

Referring now to FIG. 2, depicted is a block diagram illustrating an example computer system 200 including a queue system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the example general method described above.

In some embodiments, the computer system 200 may include a processor-based computing device. For example, the computer system 200 may include an onboard vehicle computer system of the ego vehicle 123 or the remote vehicle 124; the computer system 200 may also include an onboard computer system of the roadside device 103.

The computer system 200 may include one or more of the following elements according to some examples: the queue system 199; a processor 125; a communication unit 145; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the queue system 199 includes code and routines that are operable, when executed by the processor 125, to cause the processor 125 to execute one or more steps of the method 300 described herein with reference to FIG. 3. In some embodiments, the queue system 199 includes code and routines that are operable, when executed by the processor 125, to cause the processor 125 to execute one or more steps of the example general method described above.

In the illustrated embodiment shown in FIG. 2, the queue system 199 includes a communication module 202.

The communication module 202 can be software including routines for handling communications between the queue system 199 and other components of the computer system 200. In some embodiments, the communication module 202 can be a set of instructions executable by the processor 125 to provide the functionality described below for handling communications between the queue system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the queue system 199 and stores the data in one or more of the storage 241 and the memory 127.

In some embodiments, the communication module 202 may handle communications between components of the queue system 199 or the computer system 200.

Referring now to FIG. 3, depicted is a flowchart of an example method 300. The method 300 includes step 305 and step 310 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

In some embodiments, the method 300 is modified to include one or more of the following steps in any order: cause the onboard sensors to record sensor data; generate a beacon message based on the sensor data; transmit the beacon message; receive a beacon message; parse out the beacon data from the beacon message; analyze the beacon data to extract feature data; determine a presence of a queue based on analysis of one or more of the feature data and comparison of the feature data to the feature database; determine if a memory includes a feature database; if the memory already stores a feature database, update the feature database to include the newly extracted feature data; responsive to determining a presence of the queue, generate and transmit a command message that instructs the vehicles that receive it to form a vehicular micro cloud and, alternatively, designate the leader of the vehicular micro cloud or designates the vehicular micro cloud as leaderless; receive a report message from one or more connected vehicles in a same or similar geographic region; exchange V2X messages to share feature data with other members; share computing resources with other members, or receive computing resources from other vehicles, using V2X messages; collectively, with other members, or individually, determine analysis data based on the feature data shared among the members; share the analysis data among members using V2X communication; determine, individually or collectively among members, how to respond to the queue based on their collective or individual goals of the members; continuously record sensor data, generate beacon data, share beacons with another via V2X communication or by way of a leader, extract features from the beacon data, share the feature data with one another, and analyze the feature data to determine one or more of whether a queue is still present, why the queue is formed, the location of the head of the queue relative to the locations of the individual members, and an estimated wait time in the queue for each of the members; share feature data among the other members using V2X communication; determine that a queue is no longer present where one was previously present; responsive to the queue not being present any longer, take steps to dissolve the vehicular micro cloud.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   determining, by an onboard vehicle computer, that a queue is present in a roadway environment and that a vehicle that includes the onboard vehicle computer is present in the queue;
   causing a set of member vehicles to form a vehicular micro cloud in the roadway environment responsive to determining that the queue is present in the roadway environment so that determining that the queue is present triggers a formation of the vehicular micro cloud, wherein the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles; and
   determining, by the unused vehicular computing resources, information associated with the queue.

2. The method of claim 1, wherein the set of member vehicles execute a remedial action to respond to a presence of the queue.

3. The method of claim 1, wherein the set of member vehicles includes a sub-set of autonomous vehicles and autonomous driving systems of the sub-set of autonomous vehicles modify their operation in order to respond to the queue and conform to a set of goals of a driving plan being executed by the autonomous driving systems.

4. The method of claim 1, wherein none of the set of member vehicles is an autonomous vehicle.

5. The method of claim 1, wherein the vehicle is a leader of the vehicular micro cloud and controls when the set of member vehicles leave the vehicular micro cloud.

6. The method of claim 1, wherein the vehicle is a leader of the vehicular micro cloud and determines how to use the pool of vehicular computing resources to complete a set of tasks in an order for the set of member vehicles and the order is determined based on a set of factors that includes safety.

7. The method of claim 6, wherein the set of tasks does not include a task for the leader.

8. The method of claim 1, wherein the vehicle is a leader of the vehicular micro cloud and determines to dissolve the vehicular micro cloud responsive to determining that sensor measurements indicate that the queue is no longer present in the roadway environment.

9. The method of claim 1, wherein the pool of vehicular computing resources includes a group consisting of the following for the set of member vehicles: unused processing power; unused memory; unused sensors; and unused bandwidth.

10. A computer program product included in an onboard vehicle computer comprising computer code that is operable, when executed by the onboard vehicle computer, to cause the onboard vehicle computer to execute steps including:
    determining that a queue is present in a roadway environment and that a vehicle that includes the onboard vehicle computer is present in the queue;
    causing a set of member vehicles to form a vehicular micro cloud in the roadway environment responsive to determining that the queue is present in the roadway environment so that determining that the queue is present triggers a formation of the vehicular micro cloud, wherein the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles;
    controlling when specific members of the set of member vehicles leave the vehicular micro cloud; and
    determining, by the unused vehicular computing resources, information associated with the queue.

11. The computer program product of claim 10, wherein the information associated with the queue include one or more of: (1) whether an ego vehicle is stuck in the queue; (2) why the queue is formed; (3) a first geographic location of a head of the queue relative to a second geographic location of the ego vehicle; and (4) an estimated wait time in the queue for the ego vehicle.

12. A system comprising:
    an ego vehicle including a communication unit that is communicatively coupled to a processor, wherein the processor is executing computer-executable code that is operable, when executed by the processor, to cause the processor to:
    determine that a queue is present in a roadway environment and that a vehicle that includes processor is present in the queue;
    causing a set of member vehicles to form a vehicular micro cloud in the roadway environment responsive to determining that the queue is present in the roadway environment so that determining that the queue is present triggers a formation of the vehicular micro cloud, wherein the vehicular micro cloud includes a set of vehicles which each share all of their unused vehicular computing resources with one another to generate a pool of vehicular computing resources that exceeds a total vehicular computing resources of any single member vehicle and is used to benefit the set of member vehicles; and
    determining, by the unused vehicular computing resources, information associated with the queue.

13. The system of claim 12, wherein the set of member vehicles execute a remedial action to respond to a presence of the queue.

14. The system of claim 12, wherein the set of member vehicles includes a sub-set of autonomous vehicles and autonomous driving systems of the sub-set of autonomous vehicles modify their operation in order to respond to the queue and conform to a set of goals of a driving plan being executed by the autonomous driving systems.

15. The system of claim 12, wherein none of the set of member vehicles is an autonomous vehicle.

16. The system of claim 12, wherein the vehicle is a leader of the vehicular micro cloud and controls when the set of member vehicles leave the vehicular micro cloud.

17. The system of claim 12, wherein the vehicle is a leader of the vehicular micro cloud and determines how to use the pool of vehicular computing resources to complete a set of tasks in an order for the set of member vehicles and the order is determined based on a set of factors that includes safety.

18. The system of claim 17, wherein the set of tasks does not include a task for the leader.

19. The system of claim 12, wherein the vehicle is a leader of the vehicular micro cloud and determines to dissolve the vehicular micro cloud responsive to determining that sensor measurements indicate that the queue is no longer present in the roadway environment.

20. The system of claim 12, wherein the pool of vehicular computing resources includes a group consisting of the following for the set of member vehicles: unused processing power; unused memory; unused sensors; and unused bandwidth.

* * * * *